United States Patent

Suranyi

[11] Patent Number: 5,867,377
[45] Date of Patent: Feb. 2, 1999

[54] SYSTEM AND METHOD FOR IMPROVING THE EFFICIENCY OF RESERVE BATTERY-POWERED, PARTITIONED POWER CONVERSION SYSTEMS UNDER LIGHT LOAD CONDITIONS

[75] Inventor: Gabriel G. Suranyi, Plano, Tex.

[73] Assignee: Lucent Technologies Inc., Murray Hill, N.J.

[21] Appl. No.: 815,521

[22] Filed: Mar. 12, 1997

[51] Int. Cl.$^6$ .............................. H02M 3/18; G05F 1/24
[52] U.S. Cl. .............................. 363/60; 363/65; 363/97; 363/59; 363/21; 323/259; 323/244; 307/64; 307/66
[58] Field of Search .............................. 363/65, 97, 59, 363/60, 21; 323/259, 344; 307/64, 66

[56] References Cited

U.S. PATENT DOCUMENTS

| | | | |
|---|---|---|---|
| 4,827,150 | 5/1989 | Reynal | 307/66 |
| 5,241,217 | 8/1993 | Severinsky | 307/64 |
| 5,315,533 | 5/1994 | Stich et al. | 364/480 |
| 5,424,936 | 6/1995 | Reddy | 363/97 |
| 5,602,465 | 2/1997 | Stich et al. | 323/258 |
| 5,610,451 | 3/1997 | Symonds | 307/66 |
| 5,631,814 | 5/1997 | Zak | 363/37 |
| 5,694,312 | 12/1997 | Brand et al. | 363/144 |

*Primary Examiner*—Adolf Berhane

[57] ABSTRACT

In a partitioned power converter system having a central uninterruptible power supply ("UPS") stage couplable between a commercial power source and a peripheral stage, the central UPS stage including a primary converter that converts commercial power from the commercial power source to a distribution voltage; a battery boost converter, coupled to a battery reserve system, that boosts a battery voltage produced thereby to the distribution voltage; and mode switching circuitry that alternatively couples one of the primary converter and the battery boost converter to the peripheral stage, selective bypass circuitry and a method of increasing the efficiency of the power converter system. The selective bypass circuitry includes: (1) a controller for determining a load on the battery boost converter and (2) a bypass circuit, coupled to the controller, for coupling the battery reserve system directly to the peripheral stage when the battery boost converter is loaded less than a preselected lower limit, the bypass circuit thereby bypassing the battery boost converter and eliminating inefficiency associated therewith under light load conditions.

21 Claims, 2 Drawing Sheets

SYSTEM AND METHOD FOR IMPROVING THE EFFICIENCY OF RESERVE BATTERY-POWERED, PARTITIONED POWER CONVERSION SYSTEMS UNDER LIGHT LOAD CONDITIONS

TECHNICAL FIELD OF THE INVENTION

The present invention is directed, in general, to power conversion and, more specifically, to a system and method for increasing the efficiency of a power converter system.

BACKGROUND OF THE INVENTION

The future of telecommunications promises continuing advances in wireless and optical fiber communication technologies (among many others), culminating in the delivery of these technologies directly into people's private homes. With the impending introduction of equipment borne of these new technologies (better telephones, fax machines, computers and new types of machines not now dreamt of), a need is rapidly developing for sophisticated power conversion equipment to be located in the home to provide electric power to the equipment. The need is created because wireless communications and fiber-to-the-home interfaces cannot presently support distribution of their own electrical power.

Historically, public telephone systems have proven to be inexorably reliable. People have understandably come to expect that their ability to carry on electronic communication will be uncompromised, even if a power outage suddenly extinguishes every light in the house. Therefore, future power conversion equipment (or "power supplies") destined to provide power to residential telecommunications equipment will, most likely, require a battery reserve system for providing reserve power to the equipment in case commercial power is interrupted.

Current designs for power conversion systems for residential telecommunications equipment are based on a partitioned architecture, having both a central uninterruptible power supply ("UPS") stage and one or more peripheral converter stages. Ideally, the central UPS stage is mounted in a location that is protected from the elements (such as a garage, closet or attic) A peripheral converter stage is associated with each piece of telecommunications equipment to be powered, often being incorporated within the main chassis of the equipment itself. A bus runs throughout the house to couple the peripheral converter stage(s) to the central UPS stage.

The central UPS stage includes a primary converter for converting commercial power (120 volt, 60 Hertz AC in the United States) to an elevated distribution voltage (typically ranging from 24 to 48 volts DC, and often being 28 volts DC). The distribution voltage is elevated to increase bus efficiency. The central UPS stage further includes a battery boost converter (or boost converter) coupled to the battery reserve system (or battery) that boosts the battery voltage to the same distribution voltage. Mode switching circuitry within the central UPS stage alternatively couples either an output of the primary converter to the peripheral stage(s) (when the commercial power functions) or an output of the boost converter to the peripheral stage(s) (when the commercial power has failed).

Each peripheral stage includes a DC/DC converter that converts (usually decreases) the distribution voltage to an output voltage corresponding to that required by the telecommunications equipment to be powered.

One limitation of this type of partitioned power conversion system is that the efficiency of the system suffers greatly under light load conditions. The telecommunications equipment designed to be powered by such systems often employ advanced power management techniques, such as intermittent sleep modes, that continually lighten the load on the power conversion system. Even though the converters of the first and second stages may employ switching regulators to maximize efficiency under heavier loads, today's regulators still tend to be highly inefficient under light load conditions. For instance, at about ten percent of rated load capacity, it is not unusual for a partitioned power conversion system to attain no more than forty-five to fifty percent efficiency. Under these conditions, losses in the power conversion system may in fact exceed the power dissipated in the telecommunications equipment.

Further, when commercial power fails and the power conversion equipment is forced to draw its power from the battery, the boost converter introduces its own inefficiencies, compounding the problem of overall system inefficiency under light load conditions.

What is needed in the art is a system and method for increasing the efficiency of partitioned power conversion systems of the type described above under light load conditions.

SUMMARY OF THE INVENTION

To address the above-discussed deficiencies of the prior art, the present invention provides, in a partitioned power converter system having a central UPS stage couplable between a commercial power source and one or more peripheral stages, the central UPS stage including a primary converter that converts commercial power from the commercial power source to a distribution voltage; a battery boost converter, coupled to a battery reserve system, that boosts a battery voltage produced thereby to the distribution voltage; and mode switching circuitry that alternatively couples one of the primary converter and the battery boost converter to the peripheral stage(s), selective bypass circuitry and a method of increasing the efficiency of the power converter system.

The selective bypass circuitry includes: (1) a controller for determining a load on the battery boost converter and (2) a bypass circuit, coupled to the controller, for coupling the battery reserve system directly to the peripheral stage when the battery boost converter is loaded less than a preselected lower limit, the bypass circuit thereby bypassing the battery boost converter and eliminating inefficiency associated therewith under light load conditions.

The present invention is the first to recognize that, since the battery boost converter has significant inefficiencies, it is beneficial to bypass the battery boost converter altogether, at least during light load conditions. This results in the distribution voltage being made binary. In a system employing typical voltages, the bus carries 28 volts DC at some times and 12 volts DC at other times, depending upon at least commercial power status. "Directly," for purposes of the above statement of the invention, means that the battery voltage is not subject to substantial conversion in the battery boost converter before being delivered to the peripheral stage(s). Circuits and the like may be interposed between the reserve battery system and the peripheral stage(s), but the battery voltage is nonetheless delivered substantially unconverted. As will be described more fully, bypassing the battery boost converter under the right conditions yields substantially improved system efficiency.

In one embodiment of the present invention, the preselected lower limit is about ten percent of full-load capacity on the battery boost converter. In this embodiment, the battery boost converter is bypassed only when the reserve battery system is providing power to the peripheral stage(s) and the peripheral stage(s) are presenting only a light load about ten percent of full-load capacity on the battery boost converter. Of course, those skilled in the art should understand that a pre-selected lower limit is presented for illustrative purposes only.

In one embodiment of the present invention, the bypass circuit comprises a diode. In an alternative embodiment, the bypass circuit comprises a resistor. Those skilled in the art will see alternative means by which to bypass the battery boost converter.

In one embodiment of the present invention, the partitioned power converter system further has a charging circuit that charges the battery reserve system. Charging circuits and their operation are well known to those skilled in the art, but are not necessary in the broad scope of the invention.

In one embodiment of the present invention, the battery voltage is 12 volts DC. Similarly, in one embodiment of the present invention, the distribution voltage is 28 volts DC when the primary converter is coupled to the peripheral stage. The present invention is by no means limited to particular voltages, is not limited to direct current and does not require that the peripheral stage(s) down convert the distribution voltage to arrive at the ultimate output voltage.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
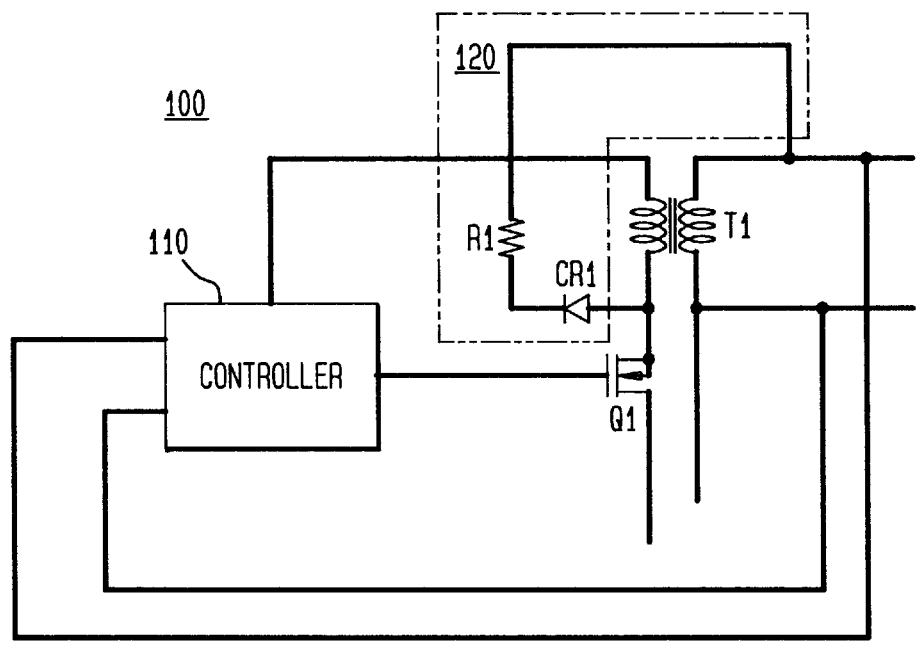
FIG. 1 illustrates a schematic diagram of an embodiment of selective bypass circuitry constructed according to the principles of the present invention.

Referring initially to FIG. 1, illustrated is a schematic diagram of an embodiment of selective bypass circuitry 100 constructed according to the principles of the present invention. The selective bypass circuitry 100 includes a controller 110 for regulating (including determining) a load on a battery boost converter (or boost converter, see FIG. 2) employing the selective bypass circuitry 100. The selective bypass circuitry 100 also includes a bypass circuit 120, coupled to the controller 110, for coupling a battery reserve system (or battery) directly to a peripheral stage (see FIG. 2) when the boost converter is loaded less than a preselected lower limit (e.g., about ten percent full-load capacity of the boost converter). The selective bypass circuitry 100 thereby bypasses the boost converter and eliminates the inefficiencies associated therewith under light load conditions.

In the illustrated embodiment of the present invention, the bypass circuit 120 includes a resistor R1 and a diode CR1. The bypass circuit 120 is coupled to a switch Q1 and bypasses a transformer T1. The diode CR1 and resistor R1 typically suppress the switching voltage transients when the switch Q1 turns off. Traditionally, the energy dissipated by the diode CR1 and resistor R1 is directed to a primary winding of the transformer T1 and dissipated as an efficiency loss. Instead of dissipating the energy in the primary winding of the transformer T1, the bypass circuit 120 feeds the energy to a secondary side of the transformer T1 thereby increasing the efficiency (e.g., about five percent) of the boost converter employing the selective bypass circuit 100 to advantage.

Thus, the efficiency is enhanced by employing the controller 110 to regulate a load on the boost converter and selectively employ the bypass circuit 120 to bypass the boost converter. Those skilled in the art should understand that while the selective bypass circuitry 100 is employed in the environment of a boost converter, other power supply topologies, including transformerless converters, are well within the broad scope of the present invention.

Figure 2:
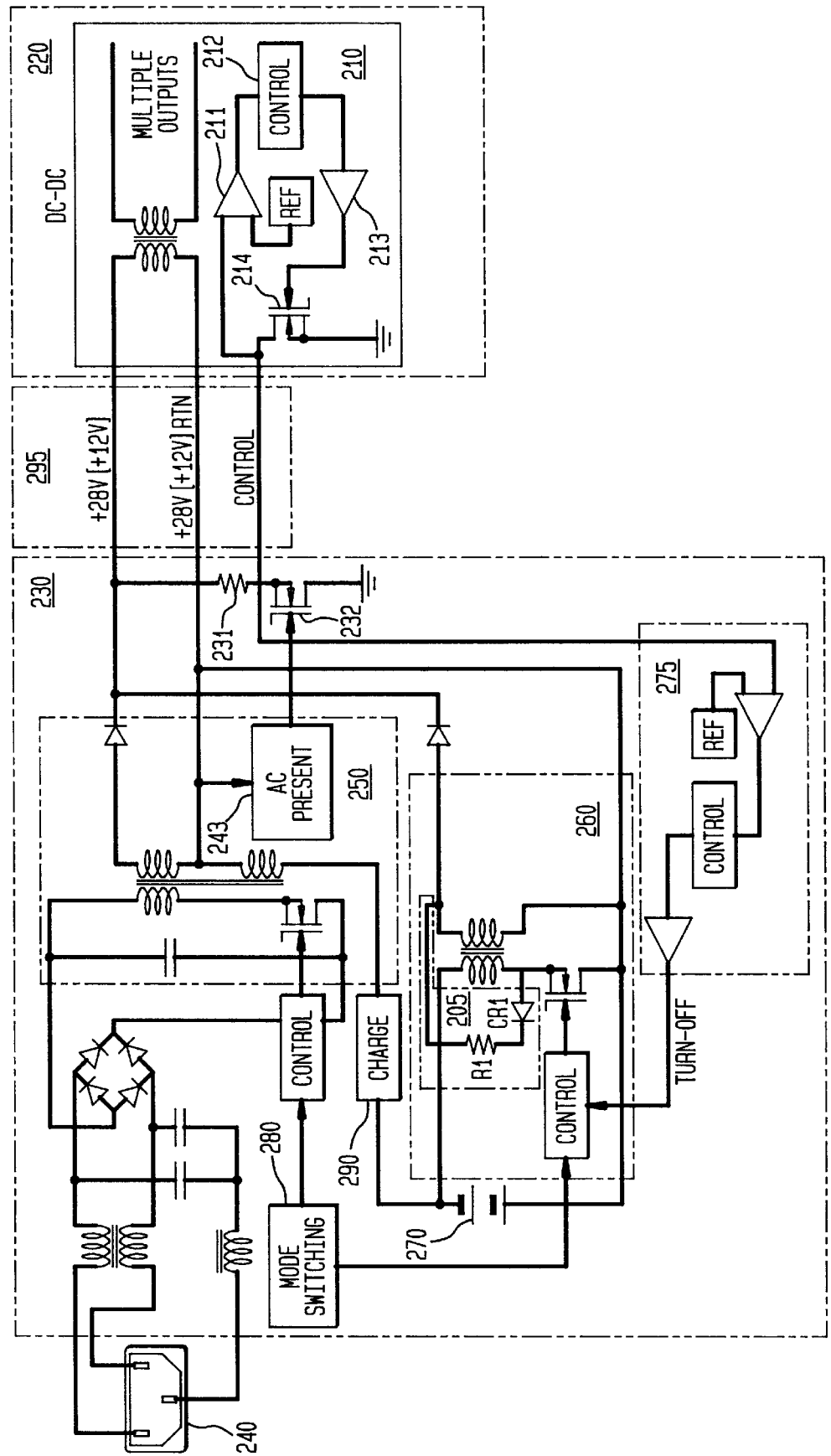
FIG. 2 illustrates a schematic diagram of a partitioned power converter system employing another embodiment of selective bypass circuitry constructed according to the principles of the present invention.

Turning now to FIG. 2, illustrated is a schematic diagram of a partitioned power converter system 200 employing another embodiment of selective bypass circuitry 205 constructed according to the principles of the present invention. The partitioned power converter system 200 includes a peripheral stage (e.g., a DC/DC converter) 210 associated with a piece of telecommunications equipment 220. The partitioned power converter system 200 also includes a central uninterruptible power supply ("UPS") stage 230 couplable to a commercial power source 240. The central UPS stage 230 includes a primary converter 250 that converts commercial power from the commercial power source 240 to a distribution voltage. The central UPS stage 230 also includes a battery boost converter (or boost converter) 260, coupled to a battery reserve system (or battery) 270, that boosts a battery voltage produced thereby to the distribution voltage. The central UPS stage 230 further includes mode switching circuitry 280 that alternatively couples one of the primary converter 250 and the boost converter 260 to the peripheral stage 210. The central UPS stage 230 still further includes a charging circuit 290 for charging the battery reserve system 270. The central UPS stage 230 still further includes the selective bypass circuitry 205 having a bypass circuit (a diode CR1 and resistor R1) and a controller (as described below in the context of the operation of the partitioned power converter system 200).

In the illustrated embodiment, the battery voltage is 12 volts DC; the distribution voltage is 28 volts DC when the primary converter 250 or the boost converter 260 is coupled to the peripheral stage 210. When the commercial power source 240 is providing power to the central UPS stage 230, the primary converter 250 converts the commercial power source 240 to the distribution voltage thereby delivering power (over a bus 295 between the central UPS stage 230 and the peripheral stage 210) to the peripheral stage 210. Conversely, when the commercial power source 240 is not providing power to the central UPS stage 230 and the battery 270 is providing power to the peripheral stage 210, the partitioned power converter system 200 operates as follows. In a first mode of operation, the boost converter 260 elevates the battery 270 voltage to the distribution voltage. In a second mode of operation, the selective bypass circuitry 205 directly couples the battery 270 to the bus 295 thereby providing a substantially equivalent voltage of the battery 270 to the peripheral stage 210.

The present invention recognizes that the partitioned power converter system 100 operates adequately with the bus 295 carrying 28 volts DC at some times and 12 volts DC at other times. As a result, efficiency gains may be realized in the converters (especially the boost converter 260) of the central UPS stage 230 without affecting the operation of the peripheral stage 210. For instance, switching regulators, such as the boost converter 260, are highly inefficient during light load conditions (e.g., ten percent of rated capacity). During light load conditions it is not uncommon for the conversion efficiency of the converter to drop to forty-five to fifty percent efficiency. At low efficiency levels of operation, the losses associated with the power conversion process may actually exceed the power dissipated by the system employing the partitioned power converter system 200. An improvement of the conversion efficiency is significant especially in view of the fact that the operational longevity of the battery 260 is critical to the system employing the partitioned power converter system 200. The selective bypass circuitry 205 increases the conversion efficiency during bypass of the boost converter 260 (e.g., to about ninety percent at about ten percent rated load capacity) thereby increasing the overall of efficiency of the partitioned power converter system 200.

The control of the dual voltage across the bus 295 may be accomplished by an interaction between the central UPS stage 230 and a system controller 212 (associated with the peripheral stage 210 in the illustrated embodiment). The central UPS stage 230 monitors the availability of the commercial power source 240 and informs the system controller 212, via an AC present indicator (designated by a block 243 within the primary converter 250) of the status of the commercial power source 240. When the commercial power source 240 is present and the primary converter 250 provides power to the peripheral stage 210, a switch 232 (located within the central UPS stage 230) is turned on and the control system between the central UPS stage 230 and the system controller 212 is pulled low through a resistor 231. With the control signal in the low state, the system controller 212 recognizes, via a comparator 211, that the commercial power source 240 is providing the power to the partitioned power converter system 200.

If the commercial power source 240 is interrupted a number of events occur simultaneously. First, the mode switching circuitry 280 turns on the boost converter 260, which is fed off the battery 270, to ensure an uninterrupted source of power to the load. Second, the AC present indicator 243 turns off the switch 232 thereby applying a high signal, via the resistor 231, across the bus 295 to the system controller 212 to indicate that the power is being supplied by the battery 270. The system controller 212, then, proceeds through a number of operational functions to ensure the longevity of the battery 270. The system controller 212 verifies the operational status of the telecommunications equipment 220 such that if the service is idle then service is not requested in the inbound or outbound direction. When service is not requested, the system controller 212 transitions the telecommunications equipment 220 into a standby mode of operation as hereinafter described.

Figure 3:
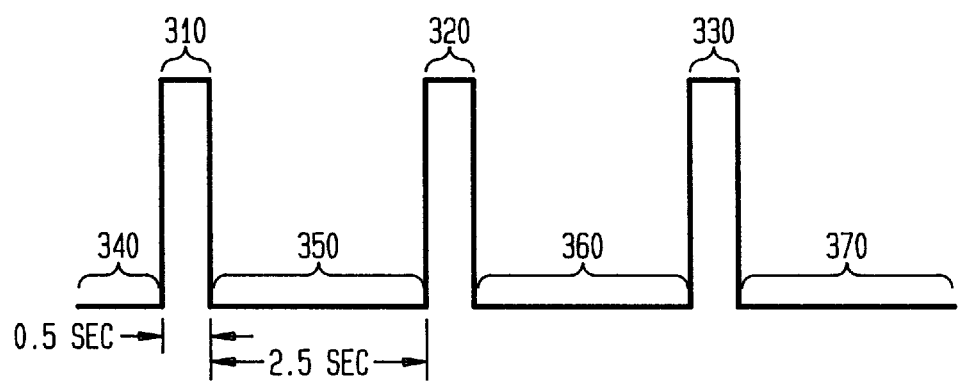
FIG. 3 illustrates a timing diagram of the power consumption of a system employing the partitioned power converter system of FIG. 2.

Turning now to FIG. 3, illustrated is a timing diagram of the power consumption of a system (e.g., telecommunications system) employing the partitioned power converter system of FIG. 2. When the system is being powered by the battery, the telecommunications equipment employs a standby mode of operation having an inquisitive mode and sleep mode cycle. The system continually alternates between the two cycles of operation. During the inquisitive cycle, the system consumes one level of power (e.g., about 10 watts) while attempting to determine whether the telecommunications equipment is receiving any inbound or outbound telephone calls. If system activation is not desired, the sleep mode is employed and the system consumes a lower level of power (e.g., about 1–3 watts) Again, the aforementioned sequence of events occurs when the battery is providing power in the partitioned power converter system.

The inquisitive cycle is illustrated by a plurality of pulses (designated 310, 320, 330) for a duration of 0.5 seconds. The sleep cycle is demonstrated by a plurality of flat regions (designated 340, 350, 360, 370) surrounding the pulses 310, 320, 330 for a duration of 2.5 seconds. The resulting operation of the telecommunications equipment prolongs the operational longevity of the battery reserve system.

Turning now to FIGS. 2 and 3 collectively, during the period of lower power consumption 340, 350, 360, 370, the system controller 212 instructs the central UPS stage 230 to employ the lower voltage (e.g., 12 volts DC) across the bus 295. The system controller 212 turns on a switch 214, via a driver 213, and pulls the control portion of the bus 295 low. A comparator within an auxiliary bypass circuit 275 of the central UPS stage 230 recognizes that the control signal is low from the system controller 212 and the auxiliary bypass circuit 275 turns off the boost converter 260. With the boost converter 260 off, a 12 volts DC signal (via the battery 270 through the bypass circuit) is applied directly to the peripheral stage 210. The efficiency of the boost converter 260 therefore improves significantly. Additionally, the efficiency of the peripheral stage 210 also improves because it dissipates less internal energy during light load conditions when its input voltage is lower.

The previously described mode of operation continues until the system controller 212 releases the switch 214 and the signal across the control portion of the bus 295 is transitioned to high. The transition occurs just before the partitioned power converter system 200 enters the inquisitive mode of operation. The auxiliary bypass circuit 275 recognizes that the control signal is high and in response deactivates the turn off signal to the boost converter 260. The boost converter 260 then turns on and the voltage across the bus 295 is transitioned to 28 volts DC.

If the commercial power source 240 is restored, the primary converter 250 immediately turns on and the mode switching circuitry 280 turns off the boost converter 260. Thereafter, the AC present indicator 243 turns on the switch 232 and pulls down the control signal. The comparator 211 associated with the system controller 212 recognizes that the commercial power source 240 is present and discontinues all standby energy saving functions. In the illustrated embodiment, the controller includes, among other things, the system controller 212 and the other auxiliary control components as illustrated and described above.

While the present invention is described in the context of a telecommunications environment, those skilled in the art should understand that the partitioned power converter system and selective bypass circuitry are equally beneficial in other environments. Those skilled in the art should understand that the partitioned power converter system is presented for illustrative purposes only and other power supply topologies and control schemes (analogous to present system whereby a load on a converter is determined and a battery reserve system is directly coupled to a peripheral stage when the converter is loaded less than a preselected lower limit) are well within the broad scope of the present invention. Furthermore, for a better understanding of power electronics including power conversion technologies see *Principles of Power Electronics,* by J. G. Kassakian, M. F. Schlecht and G. C. Verghese, Addison-Wesley 1991 and for a better understanding of control systems and architectures see *Modern Control Engineering,* by Katsuhiko Ogata, Prentice Hall 1990. The aforementioned references are herein incorporated by reference.

Although the present invention has been described in detail, those skilled in the art should understand that they can make various changes, substitutions and alterations herein without departing from the spirit and scope of the invention in its broadest form.

What is claimed is:

1. In a partitioned power converter system having a central uninterruptible power supply (UPS) stage couplable between a commercial power source and a peripheral stage, said central UPS stage including a primary converter that converts commercial power from said commercial power source to a distribution voltage; a battery boost converter, coupled to a battery reserve system, that boosts a battery voltage produced thereby to said distribution voltage; and mode switching circuitry that alternatively couples one of said primary converter and said battery boost converter to said peripheral stage, selective bypass circuitry, comprising:

a controller for determining a load on said battery boost converter; and a bypass circuit, coupled to said controller, for coupling said battery reserve system directly to said peripheral stage when said battery boost converter is loaded less than a preselected lower limit, said bypass circuit thereby bypassing said battery boost converter and eliminating inefficiency associated therewith under light load conditions.

2. The circuitry as recited in claim 1 wherein said preselected lower limit is about ten percent of full-load capacity on said battery boost converter.

3. The circuitry as recited in claim 1 wherein said bypass circuit comprises a diode.

4. The circuitry as recited in claim 1 wherein said bypass circuit comprises a resistor.

5. The circuitry as recited in claim 1 wherein said partitioned power converter system further has a charging circuit that charges said battery reserve system.

6. The circuitry as recited in claim 1 wherein said battery voltage is 12 volts DC.

7. The circuitry as recited in claim 1 wherein said distribution voltage is 28 volts DC when said primary converter is coupled to said peripheral stage.

8. For use in a partitioned power converter system having a central uninterruptible power supply (UPS) stage couplable between a commercial power source and a peripheral stage, said central UPS stage including a primary converter that converts commercial power from said commercial power source to a distribution voltage; a battery boost converter, coupled to a battery reserve system, that boosts a battery voltage produced thereby to said distribution voltage; and mode switching circuitry that alternatively couples one of said primary converter and said battery boost converter to said peripheral stage, a method of improving an efficiency of said partitioned power system, comprising the steps of:

determining a load on said battery boost converter with a controller; and coupling said battery reserve system directly to said peripheral stage with a bypass circuit, coupled to said controller, when said battery boost converter is loaded less than a preselected lower limit, said bypass circuit thereby bypassing said battery boost converter and eliminating inefficiency associated therewith under light load conditions.

9. The method as recited in claim 8 wherein said preselected lower limit is about ten percent of full-load capacity on said battery boost converter.

10. The method as recited in claim 8 wherein said step of coupling is accomplished with a diode.

11. The method as recited in claim 8 wherein said step of coupling is accomplished with a resistor.

12. The method as recited in claim 8 wherein said partitioned power converter system further has a charging circuit, said method further comprising the step of charging said battery reserve system.

13. The method as recited in claim 8 wherein said battery voltage is 12 volts DC.

14. The method as recited in claim 8 wherein said distribution voltage is 28 volts DC when said primary converter is coupled to said peripheral stage.

15. A partitioned power converter system, comprising:

at least one peripheral stage associated with a piece of telecommunications equipment; and a central uninterruptible power supply (UPS) stage couplable to a commercial power source, said central UPS stage including:

a primary converter that converts commercial power from said commercial power source to a distribution voltage, a battery boost converter, coupled to a battery reserve system, that boosts a battery voltage produced thereby to said distribution voltage, mode switching circuitry that alternatively couples one of said primary converter and said battery boost converter to said at least one peripheral stage, and selective bypass circuitry, including:

a controller for determining a load on said battery boost converter; and a bypass circuit, coupled to said controller, for coupling said battery reserve system directly to said peripheral stage when said battery boost converter is loaded less than a preselected lower limit, said bypass circuit thereby bypassing said battery boost converter and eliminating inefficiency associated therewith under light load conditions.

16. The system as recited in claim 15 wherein said preselected lower limit is about ten percent of full-load capacity on said battery boost converter.

17. The system as recited in claim 15 wherein said bypass circuit comprises a diode.

18. The system as recited in claim 15 wherein said bypass circuit comprises a resistor.

19. The system as recited in claim 15 further comprising a charging circuit, coupled to said battery reserve system, that charges said battery reserve system.

20. The system as recited in claim 15 wherein said battery voltage is 12 volts DC.

21. The system as recited in claim 15 wherein said distribution voltage is 28 volts DC when said primary converter is coupled to said at least one peripheral stage.

* * * * *